Patented Apr. 1, 1941

2,236,618

UNITED STATES PATENT OFFICE 2,236,618

AZO DYESTUFFS

Wilfrid Herbert Cliffe, Blackley, Manchester, England, assignor to Imperial Chemical Industries Limited, a corporation of Great Britain No Drawing. Original application May 21, 1937, Serial No. 144,099. Divided and this application April 18, 1940, Serial No. 330,426. In Great Britain May 26, 1936

4 Claims. (Cl. 260—178)

This invention relates to the manufacture of new azo dyestuffs. This application is a division of my application Serial No. 144,099, filed May 21, 1937.

This invention has as an object to produce new azo dyestuffs. A further object is to provide a new method of manufacturing azo dyes. A still further object is to provide a new method of dyeing. Further objects will appear hereinafter.

These objects are accomplished by the following invention. I have found that I can manufacture new azo dyestuffs by tetrazotizing 1 molecular proportion of a diamine of the general formula:

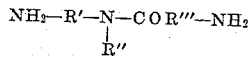

where both R' and R''' are phenylene or alkyl substituted phenylene and R'' is alkyl, and coupling with 2 molecular proportions of the same or two different coupling components.

An alternative method of manufacturing some of the new dyestuffs is by diazotizing 1 molecular proportion of a nitroamine of the formula:

where X is

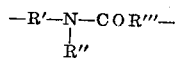

and R', R'' and R''' have the significance given above, coupling with 1 molecular proportion of a coupling component free from diazotizable amino groups, reducing the nitro group of the azo compound so obtained, and again diazotizing and coupling with 1 molecular proportion of the same or a different coupling component.

The following examples illustrate but do not limit the invention:

Example I 49.3 parts of 4:4'-diaminobenzoyl-N-dodecylanilide are dissolved in 62.5 parts of 36% aqueous hydrochloric acid and 500 parts of water and tetrazotized at 5°–10° C. with a solution of 17.2 parts of sodium nitrite in 125 parts of water. The resulting tetrazo solution is added gradually to an ice-cold solution of 66 parts of the sodium salt of 2:8-aminonaphthol-6-sulfonic acid and 50 parts of anhydrous sodium carbonate in 600 parts of water. Coupling is rapid and a portion of the new dyestuff so-formed separates out of solution. Salt is added to precipitate the remainder and the dyestuff is filtered off and dried. It dyes wool from a neutral or acid bath bright shades of red-brown and very good fastness to washing and milling and to light. It has the probable formula:

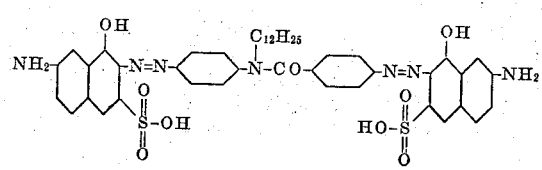

Example II 49.3 parts of 4:4'-diaminobenzoyl-N-dodecylanilide are tetrazotized as in Example I and the tetrazo solution so obtained is added gradually to an ice-cold solution of 77 parts of the sodium salt of 2-N-beta-hydroxyethylamino-8-naphthol-6-sulfonic acid and 50 parts of anhydrous sodium carbonate in 600 parts of water. Coupling is rapid and the new dyestuff so formed separates out of solution and is filtered off and dried. It dyes wool from a neutral or acid bath brown shades of very good fastness to washing and milling and of good fastness to light. It has the probable formula:

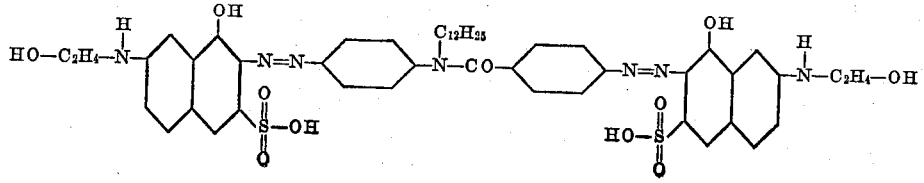

Further examples of dyestuffs obtained according to the invention are given in the following table.

to be understood that I do not limit myself to the specific embodiments thereof except as defined in the appended claims.

| Diazo component | Coupling components | Shade on wool |
|---|---|---|
| 4:4'-diaminobenzoyl-N-dodecylanilide | 2 mols. of 1(4'-sulfophenyl)-3-methyl-5-pyrazolone | Yellow. |
| Do | 2 mols. of 2-naphthol-6-sulfonic acid | Orange. |
| Do | 2 mols. of 2-naphthol-6:8 disulfonic acid | Do. |
| Do | 2 mols. of 2-naphthol-8-sulfonic acid | Do. |
| Do | 2 mols. of 2-acetylamino-5-naphthol-7-sulfonic acid | Reddish-orange. |
| Do | 2 mols. of 2-acetylamino-8-naphthol-6-sulfonic acid | Red. |
| Do | 2 mols. of 1-naphthol-4-sulfonic acid | Scarlet. |
| Do | 2 mols. of 1-naphthol-3:6-disulfonic acid | Do. |
| Do | 2 mols. of 1-acetylamino-8-naphthol-3:6-disulfonic acid | Bluish-red. |
| Do | 2 mols. of 2:8-aminonaphthol-6-sulfonic acid | Red-brown. |
| Do | 2 mols. of 2-phenylamino-8-naphthol-6-sulfonic acid | Brown. |
| 4:4'-diaminobenzoyl-N-dodecylanilide | { 1 mol. of 2:8-aminonaphthol-3:6-disulfonic acid<br>1 mol. of salicylic acid<br>1 mol. of p-nitraniline<br>acid } | Bluish-green. |
| Do | → 1:8-aminonaphthol-3:6-disulfonic acid | |
| 3:4'-diaminobenzoyl-N-cetylanilide | 2 mols of 1-(2':5'-dichloro-4'-sulfophenyl)-3-methyl-5-pyrazolone. | Yellow. |
| Do | 2 mols. of 2-naphthol-8-sulfonic acid | Orange. |
| Do | 2 mols. of 2-naphthol-6:8-disulfonic acid | Do. |
| Do | 2 mols. of 1-naphthol-4-sulfonic acid | Scarlet. |
| 4:4'-diaminobenzoyl-N-cetylanilide | 2 mols. of 1-(4'-sulfophenyl)-3-methyl-5-pyrazolone | Yellow. |
| Do | 2 mols. of 1-naphthol-4-sulfonic acid | Scarlet. |
| Do | 2 mols. of 2-N-beta-hydroxy-ethyl-amino-8-naphthol-6 sulfonic acid. | Yellowish-brown. |
| 4:4'-diaminobenzoyl-N-octadecylanilide | 2 mols. of 1-(4'-sulfophenyl)-3-methyl-5-pyrazolone | Yellow. |
| Do | 2 mols. of 2:8-aminonaphthol-6-sulfonic acid | Red-brown. |
| Do | 2 mols. of 2-naphthol-8-sulfonic acid | Orange. |

As coupling components I can use, for example, phenols, naphthols, naphtholsulfonic acids, naphthylamines, naphthylamine sulfonic acids, aminonaphthols, their sulfonic acids or N-substituted derivatives, arylpyrazolones, arylpyrazolone sulfonic or carboxylic acids or acetoaceticarylamides. Also I may use as coupling components monoazo compounds such as, for example, the compound obtained by coupling diazotized p-nitroaniline in mineral acid medium with 1:8-aminonaphthol-3:6-disulfonic acid.

Suitable diazo components may be obtained by nitrating, for example, a benzoyl- or methylbenzoyl-alkyl-anilide or a nitrobenzoylalkylanilide and subsequently reducing the dinitro compounds so-obtained either completely to give the required diamines or partially to give the required mononitroamines.

This invention is a valuable advance in the art as it gives new dyestuffs which dye wool from a neutral or acid bath to give dyeings with very good fastness to light, milling, and washing.

As many apparently widely different embodiments of this invention may be made without departing from the spirit and scope thereof, it is

I claim:
1. The compounds represented by the formula:

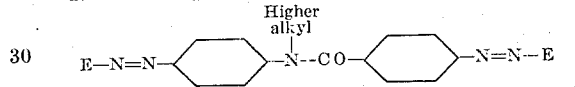

in which each E is the nucleus of an azo dyestuff coupling component.

2. The process which comprises azotizing the compound represented by the formula:

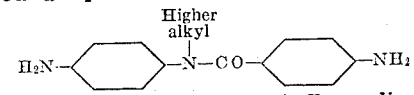

and coupling it to an azo dyestuff coupling component.

3. The compound represented by the formula:

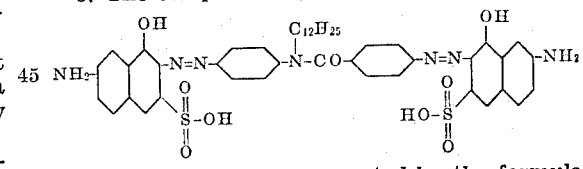

4. The compound represented by the formula:

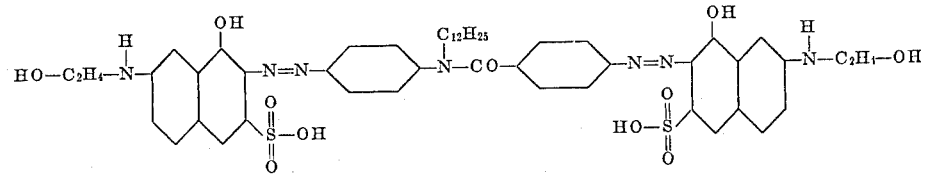

WILFRID HERBERT CLIFFE.